United States Patent Office 2,734,032
Patented Feb. 7, 1956

2,734,032

LUBRICANTS

Walter J. Coppock, Wallingford, Pa., assignor to Sun Oil Company, Philadelphia, Pa., a corporation of New Jersey No Drawing. Application December 21, 1953, Serial No. 399,587

10 Claims. (Cl. 252—52)

This invention relates to mineral lubricating oils containing plural additives.

It is known in the art to inhibit mineral lubricating oil against oxidation by incorporating therewith certain alkylated phenols, among which tertiary-butyl substituted phenols are particularly effective. Such additives, though effective in increasing the resistance of oil to deterioration by oxidation, must in some cases be used in uneconomically large concentrations in order to obtain the desired degree of resistance to such deterioration. Also, in some instances, the other properties of the oil containing alkylated phenol oxidation inhibitors may not be satisfactory, for example the resistance to copper plating may not be sufficient in the case of a refrigerator oil.

According to the present invention, a lubricant is provided which contains an alkylated phenol oxidation inhibitor and also a compound having the formula:

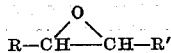

where R is selected from the group consisting of aryloxyalkyl radicals and alkoxyalkyl radicals, and where R' is selected from the group consisting of hydrogen and alkyl radicals. Preferably, neither R nor R' contains more than 10 carbon atoms; more preferably R' contains not more than 5 carbon atoms. Examples of suitable R radicals are the methoxyethyl, ethoxymethyl, butoxymethyl, hexyloxybutyl, decyloxymethyl, phenoxymethyl, methylphenoxyethyl, methyl isopropyl phenoxy methyl, bromophenoxymethyl, nitrophenoxy methyl, naphthyloxymethyl, phenoxybutyl, phenoxyoctyl, etc. Examples of suitable R' radicals are hydrogen, methyl, ethyl, n-propyl, isopropyl, butyl, hexyl, decyl, etc. Particularly preferred compounds for use according to the invention are phenoxy propylene oxide (1,2-epoxy-3-phenoxy propane) wherein R is the phenoxymethyl radical and R' is hydrogen, and butoxy propylene oxide, wherein R is butoxymethyl radical and R' is hydrogen.

It has been found that combined use of an alkylated phenol oxidation inhibitor and an epoxy compound as defined above produces lubricants superior to those obtained using the alkylated phenol as additive in the absence of the epoxy compound and to those obtained using the epoxy compound in the absence of the alkylated phenol. The beneficial results of the combined use according to the invention relate to oxidation resistance, and to resistance to copper plating in the case of a refrigerator oil. Lubricants for other uses are also beneficially affected, e. g. turbine oils and other specialty oils, as well as motor oils.

According to the invention, the alkylated phenol oxidation inhibitor and the epoxy compound are present in the oil in amount sufficient to inhibit the oil against oxidation. The concentration of the alkylated phenol oxidation inhibitor will vary according to the degree of inhibition desired, but 0.01–2.00 weight percent has been found particularly suitable. The concentration of the epoxy compound will also vary, 0.01–2.00 weight percent being particularly suitable. The ratio of the two additives to one another will also vary, but approximately equimolar proportions of the two are generally preferable.

Preferred alkylated phenol oxidation inhibitors for use according to the invention are the polyalkyl aryl hydroxy compounds such as 2,6-ditertiary butyl-4-methyl phenol, 2,4-dimethyl-6-tertiary octyl phenol, pentamethyl phenol, pentaethyl phenol, tritertiary butyl phenol, 2-isopropyl-4,6-dimethyl phenol, 2-tertiary butyl-4,6-dimethyl phenol, 2-tertiary amyl-4,6-dimethyl phenol, 4-methyl-2,6-diisopropyl phenol, 2,6-ditertiary amyl phenol-4-tertiary butyl phenol, 2,4,6-triisopropyl phenol, etc.

Although I do not wish to be bound by any theory as to the reason for the unusually good results obtained by using two additives in oil according to the present invention, it is considered possible that the epoxy compound somehow reduces the vapor pressure of the alkylated phenol oxidation inhibitor and thereby inhibits evaporation thereof from the oil under elevated temperature conditions.

The following examples illustrate the invention:

*Example 1*

The oil tested in this example was a solvent-refined, dewaxed, and clay treated distillate from mixed-base crude petroleum, the distillate having an S. U. viscosity at 100° F. of about 160. Four different samples of this oil were tested for "life period" according to A. S. T. M. Test D943–47T, "Oxidation Characteristics of Inhibited Steam Turbine Oils." The test involved subjecting the sample to the standard conditions until the acid number of the oil sample was 2.0 mg. of KOH per gram of oil, the time elapsed before such acid number was reached being taken as the life period of the sample. Each sample contained 0.015 weight percent of a somewhat prooxidant rust-inhibiting additive.

One of the four samples was tested with no oxidation inhibitor and was found to have a life period of less than 72 hours.

A second sample was tested with 0.6 weight percent of 2,6-ditertiary butyl-4-methyl phenol in the sample as sole oxidation inhibitor, and was found to have a life period of 1050 hours. A third sample was tested with 0.3 weight percent of 2,6-ditertiary butyl-4-methyl phenol and 0.3 weight percent of phenoxy propylene oxide in the sample, and was found to have a life period of 1610 hours. A fourth sample was tested with 0.6 weight percent of phenoxy propylene oxide as sole oxidation inhibitor, and was found to have a life period of less than 72 hours.

It was observed that, during the testing of the sample containing 0.6% 2,6-ditertiary butyl-4-methyl phenol, solid particles collected in the condensing apparatus, whereas during the testing of the sample containing both the alkylated phenol and phenoxy propylene oxide, no such phenomenon was observed. It is considered possible that the solid particles in the former case comprised 2,6-ditertiary butyl-4-methyl phenol, and that the superior results in the latter case were due to phenoxy propylene oxide's preventing evaporation of the alkylated phenol from the oil.

The example shows that steam turbine oils inhibited with a given amount of phenoxy propylene oxide and an equal amount of 2,6-ditertiary butyl-4-methyl phenol are more resistant to oxidation than similar oils containing either inhibitor alone in double that given amount. Thus, it is clear that when used together in such oil, phenoxy propylene oxide and 2,6-ditertiary butyl-4-methyl phenol cooperate to produce an unexpectedly good result, which is advantageous in that more inhibition can be obtained with a given total quantity of oxidation inhibitor.

Example 2

The oil tested in this example was similar to that tested in Example 1, but differed in that in this example, the oil tested was a somewhat heavier fraction, suitable as a refrigerator oil and having S. U. viscosity at 100° F. of about 510. Four different samples were tested for oxidation stability by subjecting each to a temperature of 280° F. in an oil bath for 96 hours, the sample containing coils of copper and iron wire as oxidation catalysts, and air being passed through the sample at the rate of 10 liters per hour. The color (A. S. T. M. D155–45T) and acid number (A. S. T. M. D974–48T) were measured before and after the oxidation period, and the amount of naphtha-insoluble material in the sample was also determined before and after the oxidation period.

Sample No. 1 was tested with no oxidation inhibitor; sample No. 2 with 2 weight percent of 2,6-ditertiary butyl-4-methyl phenol as sole oxidation inhibitor; sample No. 3 with 1 weight percent of 2,6-ditertiary butyl-4-methyl phenol and 1 weight percent of phenoxy propylene oxide; and sample No. 4 with 2 weight percent of phenoxy propylene oxide as sole oxidation inhibitor. Each sample had, before the oxidation period, a color of about 2¼ to 2½, an acid number of about 0, and a trace of naphtha-insoluble material. The following table shows the properties of the samples after the oxidation period.

| Sample No. | Color | Acid Number | Naphtha Insolubles |
|---|---|---|---|
| 1 | Too dark to measure | 1.35 | 0.04. |
| 2 | 5 | 0.06 | Trace. |
| 3 | 3¾ | 0 | Trace. |
| 4 | Too dark to measure | | |

Sample No. 3, representing a composition according to the present invention, is clearly superior to all other samples.

This example shows that a mineral oil distillate suitable for use, for example, as a refrigerator oil, is inhibited more effectively with a combination of the two materials, 2,6-ditertiary butyl-4-methyl phenol and phenoxy propylene oxide, than with either material alone.

Example 3

A composition comprising a naphthenic-base distillate lubricating oil having S. U. viscosity at 100° F. of about 160 seconds, 0.25 weight percent of n-butoxy propylene oxide, and 0.25 weight percent of 2,6-ditertiary butyl-4-methyl phenol was prepared and tested for oxidation stability and resistance to copper plating. The oil had been mildly furfural-refined, acid treated, and clay treated. The oxidation test was the same as that described in Example 2 except that the temperature was 240° F. The following table shows a comparison of the oil containing the two additives with, as control, the same oil containing neither additive:

| Oil | NPA Color | Acid No. | Naphtha-Insolubles |
|---|---|---|---|
| Control | Too dark to measure | 0.52 | Slight. |
| According to Invention | 3– | 0.04 | None. |

The copper plating test involved maintaining a mixture of 50 cc. of the oil and 50 cc. of carbon tetrachloride at 150° F. for extended periods of time with a copper-steel coupling having a ¼ inch by 2½ inch steel surface submerged in the oil. At the end of the test period, the steel surface was examined to determine the percent of the steel surface on which copper had been deposited. The following table shows the results obtained:

| Oil | Test Period, Hours | Percent of Surface Plated |
|---|---|---|
| Control | 96 | 80 |
| According to Invention | 600 | 0 |

For comparison, the oxidation test was also run with the same oil containing 0.5 weight percent of 2,6-ditertiary butyl-4-methyl phenol and no butoxy propylene oxide, and also with the same oil containing 0.5 weight percent of butoxy propylene oxide and none of the alkylated phenol. In each case the initial color of the oil was 1¼+. The following table shows the results as compared with the oil according to the invention:

| Additive | NPA Color | Acid No. | Naphtha-Insoluble |
|---|---|---|---|
| 0.5% alkyl phenol | 6 | 0.1 | None. |
| 0.5% butoxy propylene oxide | 8+ | 0.31 | None. |
| 0.25% alkyl phenol and 0.25% butoxy propylene oxide | 3– | 0.04 | None. |

This example shows that a naphthenic base oil containing the plural additives of the invention has good oxidation stability and resistance to copper plating, and has oxidation stability superior to the same oil containing either additive alone.

Example 4

A composition comprising a furfural-refined paraffinic-base distillate lubricating oil having S. U. viscosity at 100° F. of about 510 seconds, 0.25 weight percent of n-butoxy propylene oxide, and 0.25 weight percent of 2,6-ditertiary butyl-4-methyl phenol was prepared and tested for copper plating resistance according to the method of Example 3. The following table shows a comparison in the copper plating test of the composition according to the invention with oils containing the respective additives separately:

| Additive | Test Period, Hours | Percent Surface Plated |
|---|---|---|
| 0.5% alkyl phenol | 48 | 80 |
| 0.5% butoxy propylene oxide | 144 | 30 |
| 0.25% alkyl phenol and 0.25% butoxy propylene oxide | 1,000 | 0 |

This example shows that a paraffinic base oil containing the plural additives of the invention has superior copper plating resistance to the same oil containing either additive alone.

In the preceding examples, phenoxy propylene oxide and butoxy propylene oxide were employed as additives with 2,6-ditertiary butyl-4-methyl phenol. Generally similar results may be obtained when other epoxy compounds within the scope of the invention are employed, e. g. 2,3-epoxy-1-phenoxy butane; 1,2-epoxy-3-methyl-3-phenoxy butane; 1,2-epoxy-3-methylphenoxy propane; 1,2-epoxy-3-methylisopropylphenoxy propane; 1,2-epoxy-3-bromophenoxy propane; 1,2-epoxy-3-nitrophenoxypropane; 1,2-epoxy-3-naphthyloxy propane; 1,2-epoxy-4-phenoxy butane; 1,2-epoxy-5-phenoxy hexane; 2,3-epoxy-8-phenoxy octane; 1,2-epoxy-3-phenoxy butane; 2,3-epoxy-1-chloro-phenoxy butane; 2,3-epoxy-1-butoxy butane; 1,2-epoxy-3-methyl-3-hexyloxy butane; 1,2-epoxy-3-octyloxy propane; 1,2-epoxy-3-butoxy butane; etc.

This application is a continuation-in-part of copending application Serial No. 170,060 of Walter J. Coppock, filed June 23, 1950, and now abandoned.

The invention claimed is:

1. A lubricating composition comprising a major proportion of mineral lubricating oil as the essential lubricating component, a minor proportion of an alkylated phenol oxidation inhibitor as antioxidant, and a minor proportion of a compound having the formula:

$$R-CH-CH-R' \atop \diagdown O \diagup$$

where R is selected from the group consisting of aryloxyalkyl radicals and alkoxyalkyl radicals, and where R' is selected from the group consisting of hydrogen and alkyl radicals, neither R nor R' containing more than 10 carbon atoms, said compound acting to enhance the antioxidant action of said alkylated phenol oxidation inhibitor.

2. Composition according to claim 1 wherein said alkylated phenol oxidation inhibitor is a tertiary-butyl-substituted phenol.

3. Composition according to claim 2 wherein said tertiary-butyl-substituted phenol is 2,6-diteritary butyl-4-methyl phenol.

4. Composition according to claim 1 wherein the weight percent of said compound in the composition is about 0.01 to 2.00%, and the weight percent of said alkylated phenol is about 0.01 to 2.00%.

5. Composition according to claim 4 wherein said compound and said alkylated phenol oxidation inhibitor are present in the composition in about equimolar quantities.

6. Composition according to claim 1 wherein said compound is 1,2-epoxy-3-phenoxy propane.

7. Composition according to claim 1 wherein said compound is 1,2-epoxy-3-butoxy propane.

8. A lubricating composition comprising 96 to 99.8% mineral lubricating oil, 0.01 to 2.00% 2,6-ditertiary butyl-4-methyl phenol, and 0.01 to 2.00% 1,2-epoxy-3-phenoxy propane.

9. A lubricating composition comprising 96 to 99.8% mineral lubricating oil, 0.01 to 2.00% 2,6-ditertiary butyl-4-methyl phenol, and 0.01 to 2.00% 1,2-epoxy-3-butoxy propane.

10. Composition according to claim 1 wherein neither R nor R' contains more than 5 carbon atoms.

References Cited in the file of this patent

UNITED STATES PATENTS

| | | |
|---|---|---|
| 2,166,604 | Myer | July 18, 1939 |
| 2,202,877 | Stevens | June 4, 1940 |
| 2,636,862 | Watson | Apr. 28, 1953 |
| 2,665,254 | Coppock | Jan. 5, 1954 |